F. L. PERRY.
Propagating Plants.
No. 53,477. Patented Mar 27. 1866.
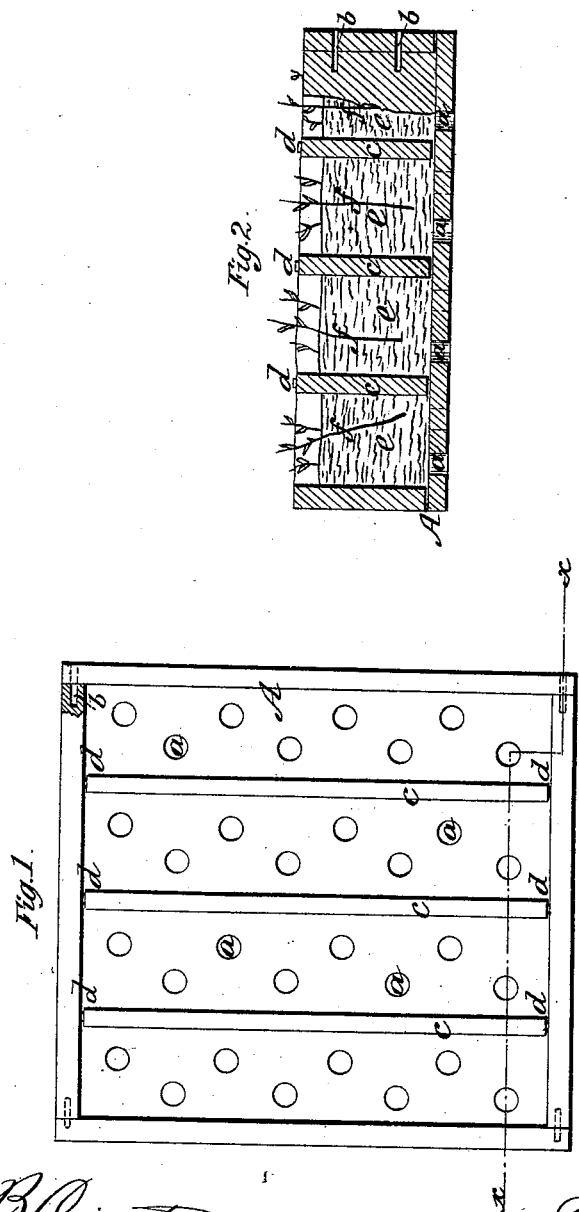
Witnesses.
Inventor.

UNITED STATES PATENT OFFICE.

F. L. PERRY, OF CANANDAIGUA, NEW YORK.

IMPROVEMENT IN BOXES FOR PROPAGATING PLANTS AND VINES.

Specification forming part of Letters Patent No. 53,477, dated March 27, 1866.

*To all whom it may concern:*

Be it known that I, F. L. PERRY, of Canandaigua, Ontario county, State of New York, have invented a new and Improved Propagating-Box; and I do hereby declare that the following is a full, clear, and exact description thereof, which will enable others skilled in the art to make and use the same, reference being had to the accompanying drawings, forming part of this specification, in which—

Figure 1 is a plan or top view of my invention; Fig. 2, a side sectional view of the same, taken in the line $x$ $x$, Fig. 1.

Similar letters of reference indicate like parts.

This invention relates to a new and improved box designed to facilitate the removal of plants or cuttings after they have taken root by the aid of what is commonly termed "bottom-heat." The plants or cuttings are sometimes planted in mold placed over a flue or heated surface, and the cuttings, after having taken root, are dug out of the mold and transplanted. This disturbs the roots and the plants are very much put back thereby. The cuttings are also frequently planted in boxes and the latter placed over a flue or heated surface, but they cannot, after having taken root, be removed from ordinary boxes without disturbing the roots. My invention is designed to obviate this difficulty; and it consists in having a box constructed with movable sides and partitions, arranged in such a manner that the mold or earth between the several partitions, with the rooted cutting in it, may be removed from the box separately and transplanted without disturbing the roots.

A represents the box of rectangular form, and constructed of either wood or metal. The former material will probably be most generally used. The bottom of this box is perforated with holes $a$, and its sides are connected together by dowel-pins $b$, so that they may be readily detached and removed from the bottom when necessary. This box is divided into a series of compartments by vertical partitions $c$, which are fitted loosely in the box and secured in position by wedges $d$ inserted between their ends and the sides of the box. These compartments are filled with mold $e$ and the cuttings $f$ planted in the mold. The box is placed over a flue or heated surface to give the bottom-heat, and the cuttings thus "forced" soon strike root. When properly rooted three sides of the box are removed and the mold of the several compartments, with the rooted cuttings in it, may be removed separately and transplanted without disturbing in the least the roots of the cuttings. The partitions $c$ are removed with the mold, one partition with each compartment, the partitions serving to keep the mold compact, preventing it from separating and becoming dislodged from the roots of the cuttings.

By this means the propagating of plants from cuttings is greatly expedited and with much better success than by the old modes. The invention is simple and quite inexpensive.

Having thus described my invention, what I claim as new, and desire to secure by Letters Patent, is—

A box for the propagation of plants or cuttings, constructed with removable or detachable sides and partitions, substantially in the manner herein set forth.

F. L. PERRY.

Witnesses:
JOHN GILLETTE, Jr.,
H. M. FIELD.